No. 783,686. PATENTED FEB. 28, 1905.
J. T. DAVIS.
NUT LOCK.
APPLICATION FILED NOV. 18, 1903.

Witnesses.
Arthur L. Slee
M. R. Seely

Inventor.
John T. Davis
by Spear Seely
Attys

No. 783,686.                                     Patented February 28, 1905.

UNITED STATES PATENT OFFICE.

JOHN T. DAVIS, OF OAKLAND, CALIFORNIA, ASSIGNOR TO JOHN TREADWELL, OF SAN FRANCISCO, CALIFORNIA.

NUT-LOCK.

SPECIFICATION forming part of Letters Patent No. 783,686, dated February 28, 1905.

Application filed November 18, 1903. Serial No. 181,684.

*To all whom it may concern:*

Be it known that I, JOHN T. DAVIS, a citizen of the United States, residing at Oakland, in the county of Alameda and State of California, have invented certain new and useful Improvements in Nut-Locks, of which the following is a specification.

My invention relates to devices for locking nuts upon bolts which enter or pass through any structure where such bolts are employed as holding or fastening means.

The principal feature of my invention is embodied in a peculiar washer interposed between the nut and the surface against which the nut would ordinarily be turned up and which is so constructed that it has an internal lock which fixes it (the said washer) in place and an external lock which engages the said washer with the nut. Thus a double lock is formed, first, by locking the washer itself and, secondly, by locking the washer to the nut.

Embodiments of my invention are shown in the accompanying drawings and are described in this specification.

Figure 1:
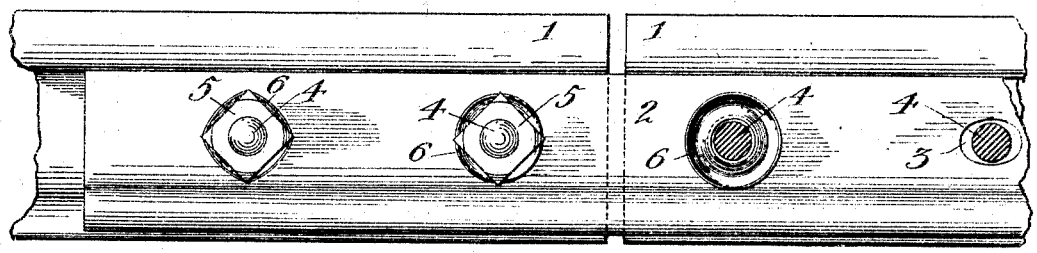
Figure 3:
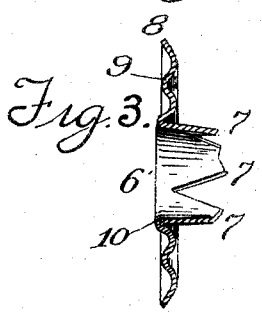
Figure 2:
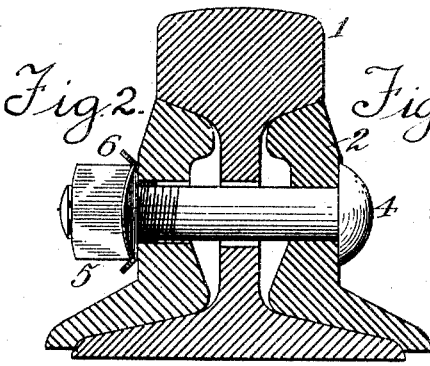
Figure 4:
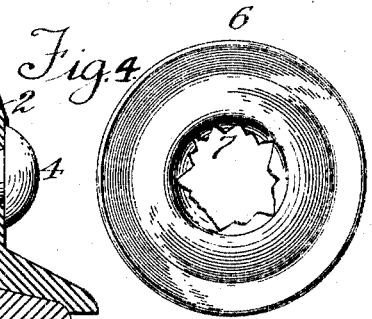
Figure 5:
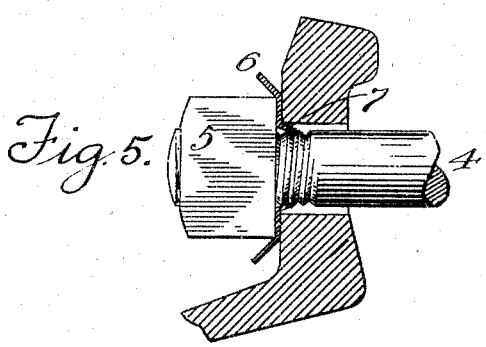

Figure 1 represents the invention as applied to a rail-joint in which the fish-plate has elongated holes. Fig. 2 is a cross-section of the nut-locking device shown in Fig. 1. Fig. 3 is a cross-section of the locking-washer. Fig. 4 is a front elevation of the said washer. Fig. 5 is a section similar to Fig. 2, but showing the locking-washer as applied to a round hole and engaging the thread of the bolt.

Referring to Figs. 1 to 4, inclusive, 1 1 represent two meeting railway-rails, and 2 is an angle-bar or fish-plate, which can be of any preferred construction and has elongated holes 3, through which pass the threaded bolts 4, adapted to receive the nuts 5.

The principal feature of my invention is a peculiar washer 6, interposed between the nut and the structure against which the nut ordinarily bears, which in Figs. 1 and 2 is the fish-plate. This washer is made of malleable metal, so as to be capable of changing its form under pressure. It has a central hole, which is oblong when the washer is applied to a fish-plate with an elongated hole, but which may be round to suit the ordinary application of bolts to round holes. A peculiar characteristic of the washer is that its central hole, whether round or oblong, is surrounded by an inwardly-turned flange having fangs, teeth, or projections 7, which lock the washer immovably to the structure when the nut is turned up against it. The shape of this washer will be clearly understood by reference to Figs. 3 and 4. Its cross-section is clearly shown in Fig. 3. It is formed between dies which give it the forwardly-turned rim 8, the circular bulge or ridge 9, and the central front cone 10 slightly beyond the plane of the periphery.

Fig. 1 is a progressive illustration of the application of this nut, and I shall now explain it in detail. At the right hand the ordinary bolt is shown passing through the elongated hole in the fish-plate. At the next bolt-hole the washer 6 has been slipped upon the bolt up against the fish-plate. In the third position the nut has been placed upon the bolt. In the fourth position the nut has been turned down to its full possible extent upon the thread of the bolt, and this has brought about the position of Fig. 2. The pressure of the nut against the washer modifies the shape of the latter in two particulars. As the nut commences to press against the central cone 10 the internal teeth, fangs, or projections 7 are forced into the hole in the fish-plate, which they fill, and thus lock the washer immovably to the structure, which in this case is the fish-plate. As the pressure continues by the turning of the nut the forwardly-turned rim 8 of the washer is bent forwardly over the square edges of the nut, as shown in Fig. 2 and also at the left-hand side of Fig. 1. In this position the washer is locked both internally and externally—internally between the fish-plate and the bolt and externally upon the nut itself. The force of the pressure exerted by the nut against the cone and rim and which changed the shape of the washer as shown has locked the nut immovably to the washer, and as the washer is locked immovably by its internal toothed flange it is impossible for the nut to jar or work loose. It will require a force exerted to turn the nut in the opposite direction and equal to that force which first bent down the washer to cause the release of the nut by bending back the overlapping parts of the rim of such washer.

When the washer is applied to a bolt which enters a round hole, as shown in Fig. 5, the same principle in construction and operation is preserved; but in this case, since the internal fangs are caused to bear inwardly against the solid edges of the round hole in the fish-plate or other backing, they are forced down against the bolt with whose threads they engage, as shown in said figure, and are thus locked. The periphery of the washer is turned down over the edges of the nut in the same manner as before described, and illustrated in Fig. 2, and the same double lock is obtained, which holds the nut immovably in position.

If the nut on the bolt is to be forced down against a wooden structure into which the bolt passes, the pressure against the interposed washer will cause the interior teeth, fangs, or projections to embed themselves in the wood around the bolt.

Thus in all the forms shown two essential features or principles are shown—first, that interior teeth or fangs on a washer interposed between the nut and any structure are forced by the pressure of a nut between the bolt and the structure penetrated by it, so as to form an interior locking device, and, second, that the rim of the washer is caused to engage with the adjacent nut, so as to form an exterior locking device for the nut itself.

A very important feature of my invention is provided by the shape of the front of the washer with particular reference to the cone or bulge 10. With a flat-faced washer it is impossible by pressure from the nut alone to turn the rim forward over the edges of said nut. With such washers a cold-chisel or similar implement must be used. By using this cone or bulge the pressure of the nut is first brought against the same, and as the pressure continues the metal is flattened, resulting, first, in the automatic engagement of the interior fangs and, secondly, in the automatic turning forward of the rim of the washer over the edges of the nut no matter what the position of the nut may be or how many sides it has. If a further excess of metal should be needed, the ridge 9 can be employed in addition; but in practice I have found the bulge or cone 10 to be sufficient for the purpose.

Having thus described my invention, what I claim as new, and desire to secure by Letters Patent, is—

1. In a washer for nut-locks, a plate having a central hole to admit the bolt, and a bulge on the front face surrounding the hole and located between said hole and the edge of the plate, whereby by the pressure of a nut against said bulge the latter is flattened and the edge of the plate bent over the nut.

2. A washer for nut-locks comprising a plate having a central hole to admit the bolt, a locking-flange surrounding the hole on the rear of said plate, and a bulge surrounding the hole on the front of said plate; whereby, by the pressure of a nut on the front of said plate the said flange is forced into locking engagement, and the edge of the plate is bent over the nut, substantially as described and shown.

3. A nut-locking washer having a central hole, a toothed flange surrounding the hole on its rear face, and a bulge surrounding the hole on its front face.

4. In combination with a structure adapted to receive a bolt, a bolt, a nut on the bolt, and a washer on the bolt between said nut and said structure, said washer having a toothed interior locking-flange, a hole for admitting the bolt and a bulge on its front face surrounding said hole whereby the pressure of the nut on said bulge will turn up the rim of the washer and lock the nut in an immovable position.

5. A washer for the described purpose, made from malleable metal and having a central hole, a flange surrounding the hole and formed into separated fangs, teeth or projections which are adapted by pressure of a nut to be forced into engagement or contact with the structure to which the bolt is applied, and a bulge surrounding the hole on the side opposite to said flange, substantially as, and for the purposes set forth.

In testimony whereof I affix my signature, in presence of two witnesses, this 31st day of October, 1903.

JOHN T. DAVIS.

Witnesses:
 L. W. SEELY,
 M. R. SEELY.